Oct. 23, 1951  F. P. WILLCOX  2,572,229
ELECTRICALLY OPERATED PHOTOGRAPHIC SHUTTER
Filed Sept. 16, 1947  2 SHEETS—SHEET 1
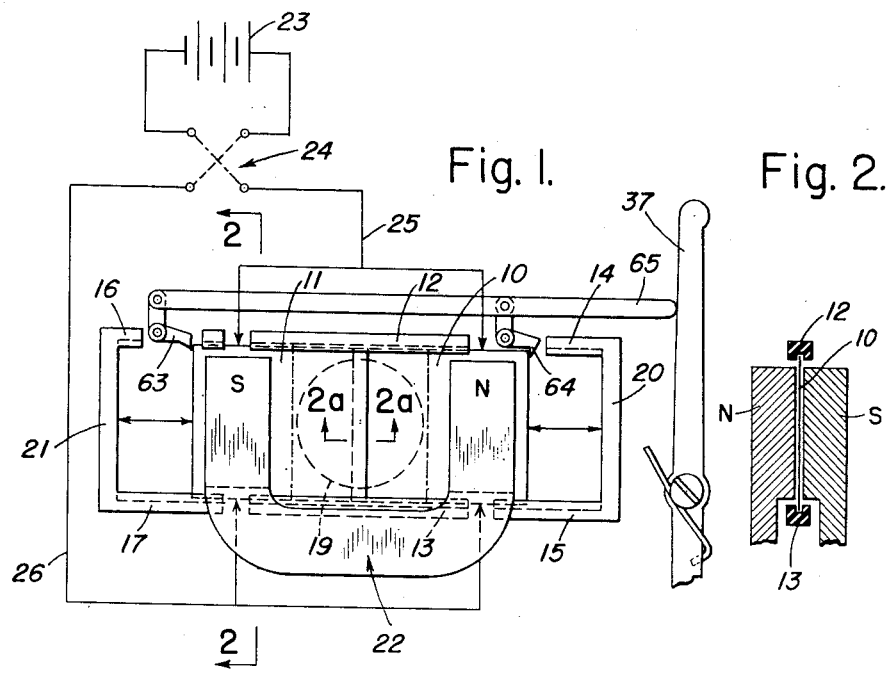
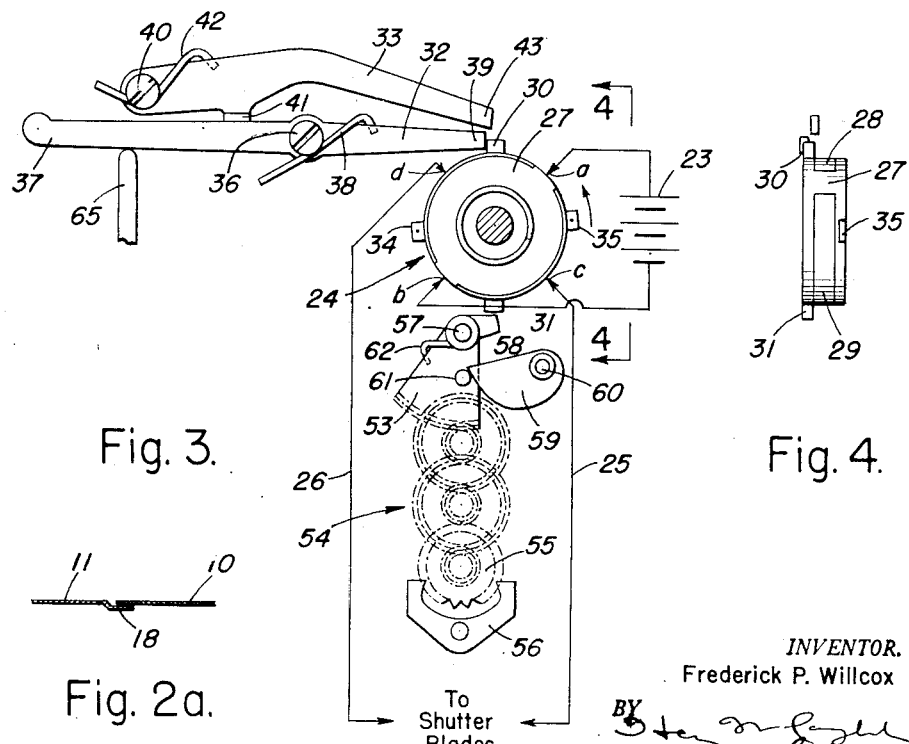
INVENTOR.
Frederick P. Willcox
ATTORNEYS Oct. 23, 1951          F. P. WILLCOX          2,572,229
ELECTRICALLY OPERATED PHOTOGRAPHIC SHUTTER
Filed Sept. 16, 1947          2 SHEETS—SHEET 2

INVENTOR.
Frederick P. Willcox
BY
ATTORNEYS

Patented Oct. 23, 1951

2,572,229

UNITED STATES PATENT OFFICE 2,572,229

ELECTRICALLY OPERATED PHOTOGRAPHIC SHUTTER

Frederick P. Willcox, Bethesda, Md., assignor to General Aniline & Film Corporation, New York, N. Y., a corporation of Delaware Application September 16, 1947, Serial No. 774,251

9 Claims. (Cl. 95—56)

This application pertains to an invention in photographic shutters and more specifically to improvements therein by which the shutter blades are electrically operated.

Among the objects of the invention is that of devising a photographic shutter which is operated electrically and in which the shutter blades of relatively low mass are operated at an extremely high speed.

Another object of the invention is that of devising a photographic shutter in which the blades themselves are guided to move in a definite pathway but for which there are no physical contacts or connections to other parts except that means which confines their movements to said pathway.

Another object of the invention is that of devising a photographic shutter in which the blades are current carrying members functioning within a magnetic field and in which the magnetic field or the direction of flow of current through the blades is altered at appropriate times thereby to reverse the movement of the parts as required.

It is a further object of the invention to control a shutter as above described for making exposures of definite duration and to control the movement of the shutter blades entirely by the relative polarity of current therethrough.

Other objects of the invention will become apparent from the following more detailed disclosure.

Photographic shutters have been electrically operated but up to this time such electrical actuation has not been reduced to such simplified form that the blades have become current carrying members movable through a magnetic field, the only physical contact with said blades being that necessary to maintain them in a prescribed pathway and to convey the current to the blades by suitable brushes or the like.

The invention may be applied to shutters having different types of blades, but as herein illustrated, two opposed rectilinearly movable blades are guided so that they uncover the usual circular aperture by a relatively short movement slightly greater than one-half the diameter of the said aperture. These blades are preferably guided in the non-conducting guideways such as some one of the usual phenolic resins or other plastic compounds adapted to offer low frictional resistance, but to serve as a bearing member where the contact pressures are extremely light as is the case here. The blades themselves are conductors of electric current, but should not be magnetic and beryllium copper or similar alloys may advantageously be employed. The current is derived from any suitable source such as a battery although, if desired, the shutter may be energized from other convenient sources of power, which is conducted to the blades through a reversing switch and short conductors, the actual contact between the blades being through brushes preferably of a type to make good electrical contacts but to offer very slight frictional resistance against the blades. In this connection, the pressure required to effect and maintain good contact is not great since the blade movement is confined to substantially a straight pathway.

The blades are operated between magnets each blade being confined to move in the magnetic field between north and south poles of what is a complete double magnet system, the opposite blade being positioned to function between the opposed poles at the opposite ends of the two magnets. The magnets may be of permanent type and should provide as strong action as possible, that is, should be of the type to present as intense a magnetic field at the blade area as is possible for the size of the parts permissible. In some instances, it may be more satisfactory or more expeditious to use an electromagnet in which event the current may be derived from any suitable source.

For controlling the opening and closing of the blades, the current through the blades is first passed in one direction and is then reversed so that the force which moves the blades first operates in the opening direction and then in the other or closing direction. For controlling the current, a reversing switch is provided and that switch may be set or tensioned manually before each shutter operation, the release thereof being controlled in the usual manner by a conventional release lever.

To vary the shutter speed, the period during which the blades are held open is regulated by a retard mechanism which may be of conventional type and which functions upon the reversing switch. That retard mechanism is adjustable to give different periods of dwell or delay at the open position at which time the reversing switch is maintained in a position to open the circuit through the blades. When the retard means has passed through its cycle and has released the reversing switch, the circuit is again closed, and current is then caused to flow through the blades in the reverse direction whereupon they are immediately closed.

Depending upon the size and mass of the parts and upon the strength of the magnets and current through the blades, movement to the open position and from the open to the closed position may be caused to occur very rapidly. As is well known to those skilled in the art, conventional shutter mechanisms take an appreciable amount of time to open the shutter blades and likewise a similar period of time to close them. That amount of time usually exceeds two milliseconds for each function and for shutters of larger sizes does not approach anywhere near that figure. Especially for shutters of the larger sizes, electrical operation, as herein described, has the decided advantage that sufficient power may be made available for greatly accelerating these opening and closing movements. The blades need not be pivoted and, therefore, there are no relatively weak points in the design which limit the forces permissible of application thereto. While the blades must be sufficiently rigid to maintain their flatness, they may be extremely thin even in the larger shutters. Their movement is in opposite directions. Therefore, there is a certain amount of counterbalancing and the shock upon reaching open or closed position does not have the usual adverse effect experienced in unbalanced shutter mechanisms when an attempt is made to operate them at high speeds. Although the aperture is not symmetrically opened, the extremely high opening and closing speeds as compared to the much longer dwell in open position obviates any lack of optical efficiency such as would be experienced if the blades were operated at relatively slow speeds as compared to the period of dwell which herein constitutes the much greater part of the total shutter movement period, that not being a fact with shutters of other types.

The invention will be described in greater detail by reference to one embodiment thereof which is illustrated in the accompanying figures of drawing, wherein:

Fig. 1 is an elevation showing the shutter, a diagrammatic power circuit therefor, and the blades in closed position.

Fig. 2 is a section through part of the mechanism of Fig. 1 taken at line 2—2.

Fig. 2a is a section showing the details of blades at line 2a—2a, Fig. 1.

Fig. 3 is an elevation showing the reversing switch, retard means, release lever, and the power circuit to and from the switch.

Fig. 4 is a view showing the reversing switch as seen from the direction 4—4, Fig. 3.

Figure 5:
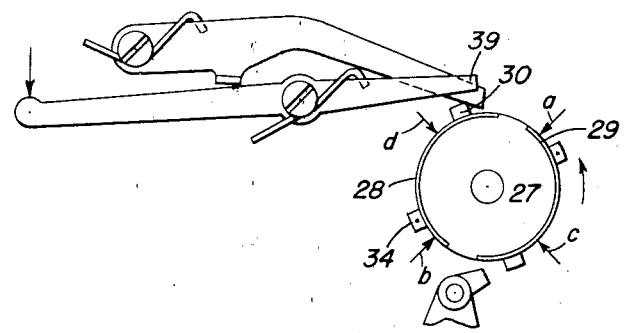
Figure 6:
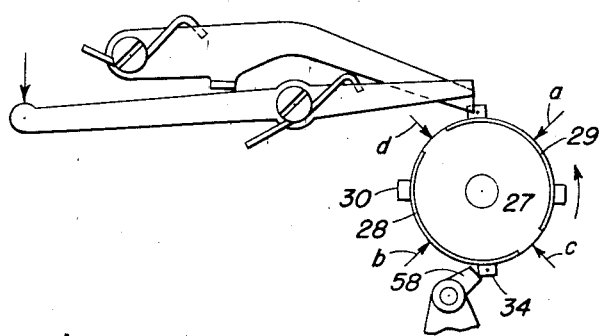
Figure 7:
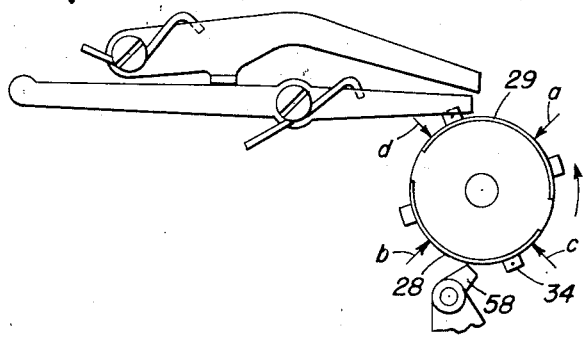

Figs. 5, 6, and 7 are views showing the switch and releasing means of Fig. 3 with the switch in different positions during the cycle of opening and closing the blades.

Figures 8, 9:
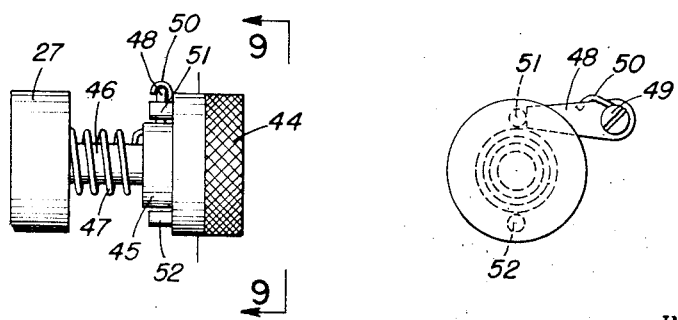

Figs. 8 and 9 are views showing details of a setting mechanism for the reversing switch.

Now referring to Figs. 1 and 2, the shutter has blades 10 and 11 which slide in the central guide members 12 and 13 and end guide members 14, 15, 16, and 17. These guide members are preferably of some more or less frictionless material which is a non-conductor such as some one of the pressed fibrous materials, phenolic resins or other molded plastic materials in which may be cut or otherwise formed suitable grooves within which the blades may slide. The material may be impregnated with a lubricant thereby to lower the coefficient of friction between the parts. As shown in Fig. 2a, the blades 10 and 11 overlap when they are closed, one of the blades being offset as at 18 to provide a light-excluding joint and to assure that the blades stop when they have reached the intended midpoint of the aperture designated by a dotted-line circle 19. The offset blade portion 18 is not of as great vertical height as the blade member itself so that the offset part does not enter the guide slot which actually fits the edge of the blade more tightly than illustrated in Fig. 2, the illustration there being opened up for purposes of clearness.

The outer guide members are connected by end pieces 20 and 21. These serve as stops against which the blades may strike as they reach their fully opened position. If desired, some sort of shock absorbing or damping means may be used to lessen the shock or the effect of the shock experienced when the blades strike against these stop members. By keeping current on for slightly more than the period necessary to complete movement of the blades, rebound is prevented.

At either side of the guide and blade assembly is a permanent magnet 22 having the polarity indicated in Fig. 1, in so far as the front magnet is concerned, it being understood that the magnet directly behind that and at the opposite side of the assembly has a reverse polarity so that for the blade 10 there is one north pole and an opposite south pole. The relationship of the poles to the blades is illustrated in Fig. 2.

In order to impart movement to the blades, each becomes a carrier of electric current within the magnetic field between the north and south pole members and the current for each of the blades is herein derived from a battery 23, but it is to be understood that any other suitable and convenient source of current may be employed. In some larger or more permanent installations, such as for large studio cameras and the like, the shutter may be electrically operated and the source of current may be the usual 110 volt line generally available. In such cases, that current may also be employed for the magnets which then become electromagnets and, within reasonable limits, may have any strength required. If the line is not a D. C. line, the suitable rectification is to be provided. The current from the source 23 is carried through a reversing switch 24 and to the blades 10 and 11 through conductors 25 and 26 each of which branches out to connect through suitable brushes to the appropriate blade surfaces. The conductor 25 connects to the top of the blades while the conductor 26 connects to the opposite or lower end of the blades.

The brushes herein designated as arrowheads bearing against the edge of the blades are preferably small metal conductors of spring material which press against the blade edges or sides of the blades adjacent the edges and which make a suitable contact although no great amount of spring pressure is necessary.

The function of the reversing switch is that of altering the flow of current through the blades first in one direction and then in the opposite. As is well known to those skilled in the art, the direction in which a conductor tends to be moved when that conductor is positioned within a magnetic field depends upon the direction of flow of current in the conductor. By controlling the direction of current flow relative to the polarity of the magnets, the blades may first be caused to open and then to close. Of course, when the blades have no current passing through them, there is no tendency to move them in either direction.

The blades are preferably formed of relatively thin material in the range from .002″ to .008″ in thickness depending upon the size of the aperture and size of the shutter, and are of a material which is non-magnetic but a good conductor. Beryllium copper alloy has been found to work satisfactorily.

Now referring to Figs. 3 and 4, details of the reversing switch and of a releasing mechanism will be described. The reversing switch, generally indicated by numeral 24 and shown diagrammatically in Fig. 1, is formed as a drum 27 of non-conducting material, such as plastic, in which are set conducting segments 28 and 29. These segments extend about the circumference of the drum as shown and have bearing against them brushes shown as arrowheads, although it is to be understood that these brushes are of conventional form, preferably of spring material bearing against the center of the conducting portions 28 and 29, or against the non-conducting drum itself depending upon the position of the switch which is rotatable through 180° for a complete shutter cycle.

For convenience, the brushes from the battery 23 to the switch are indicated by the letters $a$ and $b$. Those brushes which carry the current on to the blades through conductors 25 and 26 are indicated by the letters $c$ and $d$.

The drum 27 has adjacent one face thereof the projecting lugs 30 and 31 which serve in conjunction with the release members 32 and 33 to maintain the shutter in cocked position preparatory to release, and also to stop the switch from rotating after it has passed through 180° of movement. Two other lugs 34 and 35 at the opposite face of the drum 27 contact the retard mechanism as will hereinafter be described and since these pairs of lugs are laterally spaced along the drum, there is no conflict between any of the parts incidental to releasing the switch and to retarding it especially to determine the period of time for which the shutter blades shall remain open.

The release lever 32 is pivoted at 36 and extends outwardly to terminate in a finger piece 37, the lever further being biased by a spring 38 so that the toe portion 39 always tends to move down to engage one of the lugs 30 or 31 except as it is withdrawn therefrom when the shutter itself is to be tripped.

The auxiliary release member 33 is pivoted at 40 and has a bent lug 41 which engages above the lever 32 as shown, a spring 42 normally urging the lever downwardly, but since the effective length of the arms and strength of the springs is such that the lever 32 dominates, the toe 43 is normally held upwardly away from the lugs 30 and 31 except as the shutter is released at which time lug 41 is permitted to fall so that the toe 43 moves to lowermost position as illustrated in Figs. 5 and 6. The toe 43 is so disposed as to engage the lugs 30 or 31 prior to the time when they might be engaged by the toe 39. Thus, it can be seen that when the shutter is tripped, the drum 27 cannot make more than one-half revolution since lug 30 or 31 will be engaged by the toe 43 just short of 180° movement for the parts.

The release lever may be permitted to return to initial position at any time whereupon it will raise the lever 33, but not before the toe 39 has moved down to a position in which it will stop rotation of the drum by engaging one of the lugs 30 or 31 just after it has been released by the toe 43. Thus, the shutter mechanism and also the reversing switch pass through one complete cycle and then return to initial, untensioned position, regardless of whether the release lever is immediately permitted to return to its initial position or not.

Now referring to Figs. 8 and 9, the setting mechanism is controlled by a knob or button 44 which preferably projects from the shutter casing or from some part of the camera structure and which may conveniently be knurled or otherwise provided for positive, manual operation. The knob 44 has projecting therefrom a shouldered part 45 of reduced diameter and a short spindle portion 46. The spindle 46 enters the central bore of the drum 27 to form a bearing upon which that drum may be rotated by a spring 47, one end of which is fixed to move with the knob 44 and the other end of which is fixed in the drum 27. A latch 48 is pivoted at 49 and is urged by spring 50 into engagement with the reduced extension 45 so that it prevents reverse movement of the knob by its engagement with either one or the other of the stop pins 51 and 52. To set the shutter, it is only necessary to wind the spring 47 by making a one-half turn of the knob 34, it being understood that the spring 47 is under considerable initial tension so that it is not possible to tension for a complete turn. Any movement of the knob 44 for 180° or slightly more is locked by the latch 48 so that upon release, the drum 27 starts to move from the initial position, Fig. 3. The parts on the drum are symmetrically arranged so that each 180° of circumference thereon performs all necessary functions for controlling current and for retarding the blade closing according to the intended cycle.

Now referring to Fig. 3, the retarding means comprises a sector gear 53, a train of gears generally indicated by numeral 54 and driven by the sector gear, said train terminating in a star wheel 55 influenced by a pallet 56. The sector gear is pivoted at 57 and has a projecting arm 58 which is engaged by one of the lugs 34 or 35 in the event there is to be some retardation of the shutter closing phase. There will be such retardation except at the higher shutter speeds, and in some instances, since the shutter blades are opened and closed at a much faster relative speed as compared to the total time of shutter opening, some retardation may be employed even at the fastest speed. The pallet may be disengaged to lessen the retarding effect.

For initially positioning the retard mechanism to give different periods of retardation, a cam 59 is pivoted at 60 and bears against a pin 61 extending from the sector gear 53. In the position illustrated in Fig. 3, there is to be no contact at all between the lugs and the arm 58. As the cam 59 is swung clockwise, the sector gear under the influence of spring 62 is caused to move counterclockwise thereby projecting the arm 58 into the pathway of the lugs 34 and 35. The control for the cam 59 is preferably extended out through the shutter casing or through some appropriate part of the enclosing structure at the camera to a suitable lever or knob cooperating with the dial or other graduations to indicate the shutter speeds.

Now referring to Figs. 3, 5, 6, and 7, one cycle of operation will be described. In Fig. 3, the parts are in position preparatory to being released and it is to be assumed that the shutter has been tensioned by rotating knob 44, it being impossible to move drum 27 at that time since the release lever 32 prevents that. It should be assumed that the retarding means has been set to give some retardation and thus the arm 58 is projected into the pathway of the lug 34. The brushes *a* and *b* bear against non-conducting parts of the drum so that no current is permitted to flow at the blades.

In Fig. 5, release has been effected by withdrawing the toe 39 from the lug 30 whereupon the reversing switch starts its movement in a counterclockwise direction. The brushes *a* and *c* then bear against the conducting segment 29 so that the current from the source passes through the conductor 25 to the blades. It flows downwardly through the blades and the circuit is completed through conductor 26, the brush *d*, segment 28 and brush *b* back to the opposite side of the battery or other source of supply.

Under the conditions just described and as illustrated in Fig. 5, the blades are opened. That condition continues until just before the 90° position, and at that position, Fig. 6, the lug 34 engages the arm 58 thereby stopping rotation of the drum 27 until the said lug 34 is released or until the retard mechanism has been moved to one extremity of its travel. At that 90° position, the brushes *c* and *d* encounter non-conducting portions of the drum so that while the retard mechanism is acting, no current flows through the blades.

As shown in Fig. 7, the lug 34 has slipped past the arm 58 so that under the influence of the spring 47, the drum continues in its counterclockwise rotation, the direction of current however, having been reversed. Now the current flow is from the source through the brush *a*, segment 29, brush *d*, and conductor 26 to the bottom of the blades, the circuit being completed through conductor 25, brush *c*, segment 28, and brush *b*. Thus, shortly after the 90° position has been passed, the current is switched to flow through the blades in the opposite direction, that being effective in cooperation with the polarity of the magnets to move the blades to closed position.

The condition existing in Fig. 7, continues until the brushes *a* and *b* again encounter non-conducting portions of the drum and the opposite lug on the drum is engaged by the release lever 32 all as illustrated in Fig. 3, except that the mechanism will have rotated throughout 180°.

While this disclosure is primarily concerned with the mechanism by which the blades are to be moved at a very rapid rate, in Figs. 1 and 3, is to be found a means for holding them in inactive position. Since the blades might move under influence of gravity or when the camera is quickly moved, it is desirable to retain them in closed position positively, but to release them just before current is switched through the blades.

Each blade is engaged by a latch 63 or 64, as the case may be, and these latches pivoted adjacent the blades and urged toward them by springs, are controlled by a common link 65. This link connects either directly or indirectly, to be actuated by the release lever 37. The timing is such that just prior to release of the rotary switch the latches are moved free of the blades. There is no time for accidental movement before the current actuates the blades to open them. Then upon closing the shutter and releasing the lever 37, the latches again perform their intended duty.

If electromagnets are to be used instead of permanent magnets, the cores may take much the same form as the magnets herein shown and suitable windings provided in a manner known to those skilled in the art. While the magnets described heretofore have been of a type serving for both blades, it is contemplated that separate magnets may be employed, either permanent or electromagnets, so that each blade will operate between a north and south pole of its own independent magnet. In that event, the strength of the magnetic fields should be as nearly the same as possible.

If only a single blade is to be utilized, then only a single magnet with the blade working between its poles is required. With electromagnets, the energization of the coils must occur just shortly before the shutter is to be opened so as to permit complete saturation of the cores.

If a symmetrical opening of the aperture is desired, certain types of blades having triangular or semi-circular notches as are known in the art may be substituted for the straight edged blades of this disclosure. In that event, the aperture, especially if stopped down, may be symmetrically opened or nearly symmetrically opened so that for all practical purposes, the light admitted is not asymmetrically restricted from any part of the focal plane during the opening or closing of the shutter.

The retard mechanism herein illustrated and described is of conventional type, but magnetic retards or other types may be employed and if desired a compound retard train may be used, especially if the shutter is to provide for long exposures as well as instantaneous exposures of a number of separate speeds.

As described hereinabove, the shutter is to be reset for each individual exposure. If desired, the spring which operates the reversing switch may be of such length that a complete winding of several turns would operate the shutter a number of times, for example, 12 or 36 times depending upon the number of exposures which it might be desirable to make at any loading of the camera. In that case, on insertion of a new film, the shutter when fully wound, serves until the film has been exposed the requisite number of times, thereby making the shutter operation more automatic. Winding of the film or advancing the film in some manner would probably be essential and the camera mechanism could be designed for semi-automatic operation of this type.

While one embodiment of the invention has been disclosed, it is to be understood that the inventive concept may be carried out in a number of ways. This application is, therefore, not to be limited to the precise details described, but is intended to cover all variations and modifications thereof falling within the spirit of the invention and the scope of the claims.

I claim:

1. In a photographic shutter, a plurality of movable blade members for covering and uncovering a light-admitting aperture and means for moving said blades to open and to close the aperture comprising magnets positioned adjacent said blades having a magnetic field of fixed polarity perpendicular to the direction of motion of said blades, the lines of force of said field being cut by said blades, and means in electrical connection with said blades for passing electric current therethrough in a direction substantially perpendicular to said field and to the direction of movement of the blades, and means including a rotary reversing switch for opening and closing the circuit through said blades, said reversing switch having conducting and non-conducting portions and brushes in contact with said conducting and non-conducting portions so disposed that for part of a revolution of said switch, current is led through the blades in one direction causing displacement of said blades in said magnet field in one direction and for another part of the revolution of said switch, current is reversed to pass through said blades in the opposite direction, causing displacement of said blades in said magnet field in the other direction.

2. In a photographic shutter, a plurality of movable blade members for covering and uncovering a light-admitting aperture and means for moving said blades to open and to close the aperture comprising magnets between which said blades are operably disposed, said magnets at the opposite sides of each blade being of opposite polarity and having a field perpendicular to the direction of motion of said blades, the lines of force of said field being cut by said blades, a source of unidirectional electric current and means for conducting said current through said blades in the direction perpendicular to said field and to the direction of motion of said blades including a circuit, a reversing switch in said circuit and means for rotating said reversing switch throughout a partial revolution including a tensioned spring, means for tensioning said spring prior to releasing and operating said shutter, lugs projecting from said reversing switch and shutter release means for engagement with said lugs to hold the switch against rotation, but movable to disengage said lugs whenever said reversing switch is to be rotated for conducting current to the blades first in one direction and then in the opposite direction thereby causing displacement of said blades so as to open and to close under the magneto-motive force between said magnet fields.

3. In a photographic shutter, a plurality of movable blade members for covering and uncovering a light-admitting aperture and means for moving said blades to open and to close the aperture comprising magnets between which said blades are operably disposed, said magnets at the opposite sides of each blade being of opposite polarity and producing a fixed magnetic field perpendicular to the direction of motion of said blades, the lines of force of said field being cut by said blades, means in electrical connection with said blades including a source of unidirectional electric current and a circuit by which current is conducted from said source through said blades in a direction transverse to said field and to the motion of said blades, and a reversing switch comprising a rotary drum having at its outer periphery conducting and non-conducting portions, lugs projecting from said drum and shutter release means engageable with one of said lugs for restraining said drum against rotation except upon release thereof when said shutter is to be operated, brushes engageable with the surface of said drum for alternately contacting the conducting and non-conducting portions thereof, said brushes being so disposed as to carry current through the conducting portions of said drum and through the shutter blades in one direction when said drum is moving through one angular portion of its cycle to open the blades, and engageable with non-conducting portions of the drum when said blades are to be held stationary, and during other angular positions in the cycle of movement of said drum being engageable with the conducting portions of the drum in a reverse manner thereby to conduct the current through the blades in a reverse direction for closing them.

4. In a photographic shutter, a plurality of movable blade members for covering and uncovering a light-admitting aperture and means for moving said blades to open and to close the aperture comprising magnets between which said blades are movably disposed, said magnets at the opposite sides of each blade being of opposite polarity and having a fixed field perpendicular to the direction of motion of said blades, the lines of force of said field being cut by said blades comprising two U-shaped permanent magnets, the pole members of which are spaced a distance slightly greater than the thickness of said blades, and in a position to overlie a substantial portion of the faces of said blades, and a source of unidirectional current and electrical connections from said source to said blades for passing current from said source therethrough in a direction substantially normal to said field and to the direction of movement of the blades and a reversing switch in said circuit for controlling the direction of current flow through said blades so that said current may pass in one direction for opening the blades and then in the opposite direction for moving them to closed position.

5. In a photographic shutter, a plurality of movable blade members for covering and uncovering a light-admitting aperture and means for moving said blades to open and to close the aperture comprising two U-shaped magnets, parallelly but reversely positioned so that the opposite poles of the magnets are adjacent and lie at either side of said blade members, producing a magnetic field of fixed polarity perpendicular to the direction of motion of said blades, the lines of force of said field being cut by said blades, and means in electrical connection with said blades for passing electric current therethrough in a direction substantially normal to said field and to the direction of movement of the blades and means for reversing the direction of said current after the blades have been moved to open position.

6. In a photographic shutter, a plurality of movable blade members for covering and uncovering a light-admitting aperture and means for moving said blades to open and to close the aperture comprising magnets between which said blades are movably disposed, said magnets at the opposite sides of said blades being of opposite polarity producing a fixed magnetic field perpendicular to the direction of motion of said blades, the lines of force of said field being cut by said blades, and means in electrical connection with said blades for conducting current through the blades in a direction substantially normal to said field and to the direction of movement of the blades, and means for controlling the direction of current flow through the blades and for reversing that flow after the blades have reached open position, and a retarding means engageable with and operable upon said means for controlling and reversing the current through the blades for controlling the length of time for which said blades remain in open position.

7. In a photographic shutter, a plurality of movable blade members for covering and uncovering a light-admitting aperture and means for moving said blades to open and to close the aperture comprising magnets between which said blades are movably disposed, said magnets at the opposite sides of said blades being of opposite polarity producing a fixed magnetic field perpendicular to the direction of motion of said blades, the lines of force of said field being cut by said blades, and means in electrical connection with said blades for conveying current through the blades in a direction substantially normal to said field and to the direction of movement of the blades, and means for controlling the direction of current flow through the blades comprising a reversing switch having conducting and non-conducting portions so disposed that for part of a rotation of said switch current is led through the blades in one direction and for another part of the revolution of said switch, current is reversed to pass through the blades in the opposite direction, lugs projecting from said reversing switch and shutter release means engageable with said lugs, other lugs projecting from said switch and movable in a plane spaced from a plane in which said first-mentioned lugs are movable, and a retarding means engageable by said other lugs for restraining the switch from movement at a time when the blades are opened, thereby to delay the reversing of the current and the return of the blades to closed position.

8. An electro magnetic photographic shutter comprising a plurality of movable blade members for covering and uncovering a light admitting aperture, means for creating a magnetic field of fixed polarity perpendicular to the direction of motion of said blades, the lines of force of said field being cut by said blades, and means for actuating said blades into open and closed positions including a source of unidirectional current, a circuit for conducting current through said blades in the direction perpendicular to said field and to the direction of motion of said blades, and switching means for initiating current flow in one direction for actuation of said blades in one position and for reversing said current flow for actuating of said blades in the other position.

9. An electro magnetic photographic shutter comprising a plurality of movable blade members for covering and uncovering a light admitting aperture, means for creating a magnetic field of fixed polarity perpendicular to the direction of motion of said blades, the lines of force of said field being cut by said blades, comprising permanent magnets disposed around said blades and means for actuating said blades into open and closed positions including a source of unidirectional current, a circuit for conducting current through said blades in the direction perpendicular to said field and to the direction of motion of said blades, and switching means for initiating current flow in one direction for actuation of said blades to open position and for reversing said current flow for actuating of said blades to closed position.

FREDERICK P. WILLCOX.

REFERENCES CITED

The following references are of record in the file of this patent:

UNITED STATES PATENTS

| Number | Name | Date |
| --- | --- | --- |
| 1,631,963 | Ives | June 14, 1927 |
| 1,686,355 | Wente | Oct. 2, 1928 |
| 2,107,752 | Harley | Feb. 8, 1938 |
| 2,324,076 | Goldberg | July 13, 1943 |